United States Patent [19]

Catani

[11] Patent Number: 4,527,748
[45] Date of Patent: Jul. 9, 1985

[54] TUBULAR MILL FOR GRINDING NATURAL AND SYNTHETIC RAW MATERIALS, PARTICULARLY FOR THE CEMENT INDUSTRY

[75] Inventor: Paolo Catani, Bergamo, Italy

[73] Assignee: ITALCEMENTI Fabbriche Riunite Cemento S.p.A., Bergamo, Italy

[21] Appl. No.: 517,435

[22] Filed: Jul. 26, 1983

[30] Foreign Application Priority Data

Dec. 28, 1982 [IT] Italy .................... 25011 A/82

[51] Int. Cl.³ .................................. B02C 4/32
[52] U.S. Cl. .................... 241/57; 241/115; 241/122; 241/228; 241/230; 241/252
[58] Field of Search .......... 241/228, 230, 231, 57, 241/79.1, 248, 251, 252, 259.3, 115, 116, 119, 121, 122, 299

[56] References Cited

U.S. PATENT DOCUMENTS

| | | | |
|---|---|---|---|
| 1,428,687 | 9/1922 | Ferencz | 241/228 X |
| 1,475,693 | 11/1923 | Ferencz | 241/228 X |
| 1,479,141 | 1/1924 | Kent | 241/122 X |
| 1,719,979 | 7/1929 | Ihlefeldt | 241/122 X |
| 2,258,392 | 10/1941 | Piper | 241/228 X |

*Primary Examiner*—Mark Rosenbaum
*Attorney, Agent, or Firm*—Charles A. Brown; Charles E. Brown

[57] ABSTRACT

The invention relates to a tubular mill for grinding natural and synthetic raw materials, in particular for the cement industry, comprising a horizontally-disposed rotary cylindrical drum, characterized by comprising one or more fixed grinding rollers disposed radially within the drum and supported by a fixed shaft which extends along the axis of rotation, each of said rollers being idle and able to rotate by friction within an annular guide rigid with the inner wall of the drum.

10 Claims, 2 Drawing Figures

TUBULAR MILL FOR GRINDING NATURAL AND SYNTHETIC RAW MATERIALS, PARTICULARLY FOR THE CEMENT INDUSTRY

Various types of mills, including tubular rotary drum mills, are used in the grinding of natural and synthetic raw materials, in particular for the cement industry.

These latter mills are in the form of horizontally-disposed rotary cylindrical shells with a drum length greater than the diameter, and filled partly with metal balls which grind the material during the cylinder rotation.

In "open circuit" tubular mills, the material enters at one end of the mill and passes through two or three chambers containing balls of decreasing diameter before leaving from the other end as finished product.

In these mills, which are relatively long, the specific electricity consumption is high because the efficiency of grinding by means of balls which collide with each other is relatively low, and moreover because of the length of the mill the material already refined in the initial part of the mill risks becoming further ground to no advantage, with the possibility of the damaging reagglomeration phenomenon and "collage".

"Closed circuit" tubular mills differ from the preceding in that the cylindrical shell is shorter, and the material leaving the mill is fed mechanically to an air separator, the coarser product then being fed back to the mill inlet.

With this type of mill there is improved control of the fineness of grinding. However, the complexity of the mechanical elevation and selection systems external to the mill and the additional electricity consumption of these auxiliary machines are such as to make it preferable to use the less sophisticated "open circuit" tubular mills as heretofore described, especially for producing cement which is not very finely ground.

The object of the present invention is to provide a tubular mill which obviates the aforesaid main drawbacks, and in particular which is substantially simple and constructionally compact, and with an electricity consumption which is decidedly lower than the consumption of known tubular mills.

The new mill according to the invention is also to provide optimum grinding in which the aforesaid excess grinding problems are obviated.

These objects are attained according to the invention by a tubular mill for grinding natural and synthetic raw materials, in particular for the cement industry, comprising a horizontally-disposed rotary cylindrical drum, characterised by comprising one or more fixed grinding rollers disposed radially within the drum and supported by a fixed shaft which extends along the axis of rotation, each of said rollers being idle and above to rotate by friction within an annular guide rigid with the inner wall of the drum.

The characteristics and advantages of the invention will be more apparent from the non-limiting description given hereinafter of one embodiment thereof with reference to the figures of the accompanying drawing.

Figure 1:
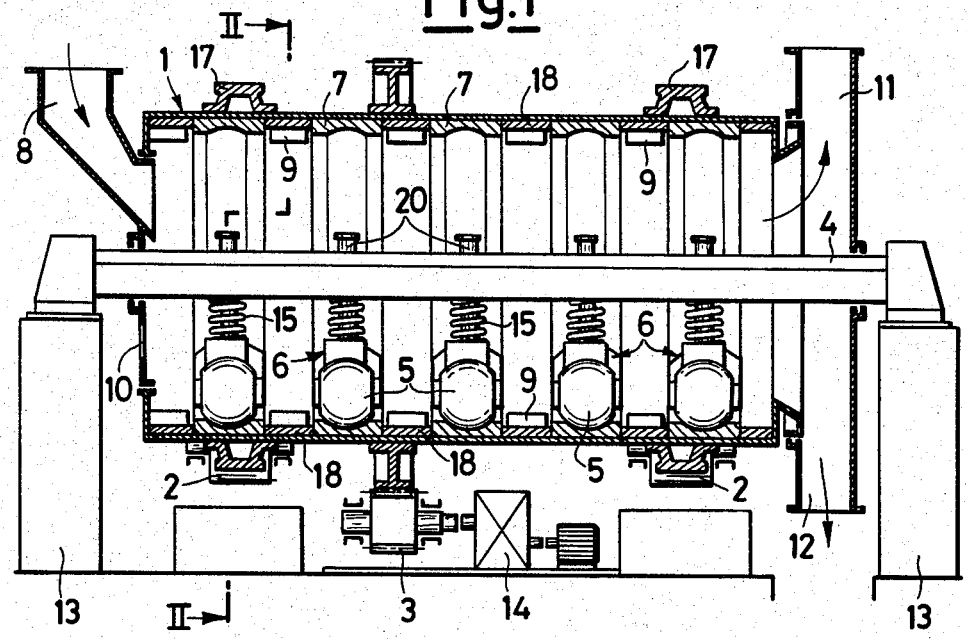
FIG. 1 is a longitudinal section through the mill on the line I—I of FIG. 2.
Figure 2:
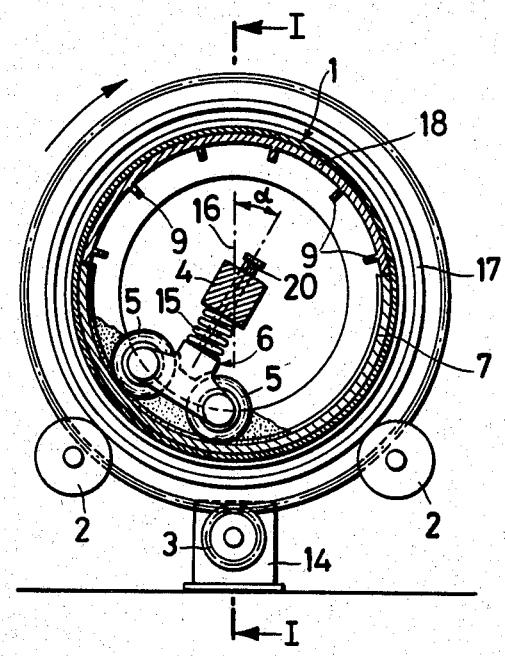
FIG. 2 is a cross-section through the mill on the line II—II of FIG. 1.

With reference to said figures, a tubular mill according to the invention comprises a cylindrical drum 1 disposed horizontally coaxially to a fixed shaft 4 and rigid with a pair of external supports 13.

The drum 1 can rotate about its own longitudinal axis by a gear transmission 3 driven by a motor 14, the drum resting on two pairs of external rollers 2 by way of rolling rings 17.

On the inner wall of the drum 1 are fixed annular guides 7 of concave profile in which pairs of grinding rollers 5 can rotate by friction, these latter being of convex profile complementary to that of said guides and supported by a carriage 6 provided with adjustable elastic thrust means, for example springs 15, said carriage being rigidly fixed by a pin 20 to said shaft 4. The pin 20 of each carriage 6 is disposed at an angle α to the vertical axis 16 of the shell 1, which angle can be suitably varied and can be different for each group of grinding rollers. Rings 18 provided with equidistant blades 9 are fixed on the inner wall of the drum 1 alternately with said annular guides 7. The mill drum is provided at its front with a port 8 for feeding the material to be ground, and with a port 10 for feeding an adjustable stream of air. At the other end it is provided with a pair of discharge ports, the upper one, 11, being for the exit of the air and the more finely ground material, and the lower one, 12, being for the more coarsely ground material.

The operation of the mill is briefly as follows: on operating the gear transmission 3, the drum rotates and the material to be ground is fed through the port 8. Simultaneously a stream of air is fed through 10 at a suitably controlled temperature and throughput.

The material, pulled by its own weight towards the bottom of the drum, reaches the annular portion of the chamber in which the first pair of grinding rollers 5 acts, these compressing the material with an elastic thrust against the annular guide 7 which rotates rigidly with the drum, to induce grinding of the material. The angle α of inclination of the axis of each carriage 6 is chosen as a function of the position which the material tends to occupy within the drum in the zone in which the rollers of that carriage act.

The material tends to occupy a determined zone of the inner chamber of the drum which depends on its particle size and on the speed of rotation of the mill, which must be slow enough not to produce centrifuging.

The angle α of each pair of grinding rollers is therefore chosen so that the rollers act in the zone in which the material tends to deposit.

The pressure which these exert on the guide with which they cooperate, and which can be adjusted by the elastic thrust means of the carriage, is chosen differently for different pairs so that the load on the material varies progressively according to the different grinding requirements.

The material ground by the first pair of rollers 5 passes into the next annular portion where the blades 9 act, and raise the ground material as they rotate rigidly with the drum. The air stream fed through 10 then selects the finer material and entrains it, so separating it from the heavier material, which falls downwards.

The material then passes from the bladed annular portion to the next annular guide 7, where it is ground by the pair of rollers 5 which cooperate with that guide, and so on.

After passing through the successive grinding and raising stations, and having thus been gradually and progressively refined, the coarser material leaves through the port 12, while the finer material entrained by the air stream leaves through the port 11 in the direction of a filter.

The material leaves the mill according to the invention completely ground without the need for further selection operations. Only if a product is required of particular fineness or particle size is it necessary to provide a subsequent selection process external to the mill. The coarser portions would then be re-fed to the mill.

The tubular mill of the invention effectively attains the initially stated objects. In this respect, it represents an extremely compact apparatus which is self-contained and of substantially lesser overall size than known tubular ball mills. The electricity consumption is reduced to as low as 50% that of mills of the known art.

Furthermore, as stated, the grinding produced by it is optimum without the need for further treatment, and the required degree of refining can be attained by the various described grinding adjustment and control systems.

The elastic thrust means for the grinding rollers can comprise hydraulic or pneumatic pistons. The rollers external to the rotating shell of the drum are positioned so as to best support the pressure of the internal grinding rollers. The rolling rings fixed to the outer surface of the drum, and which make contact with the rolling rollers, are suitably lubricated.

In one modification of the apparatus, all the ground material can be discharged by conveying it by means of the gaseous stream fed to the front.

Numerous other modifications can be provided, for example relating to the number or structure of the grinding rollers, the arrangement of the inlet and discharge ports, the rotation means etc.

I claim:

1. A tubular mill for grinding natural and synthetic raw material, said mill comprising a horizontally disposed rotary cylindrical drum, said drum having an inner and outer wall, at least one grinding roller means being disposed radially within said drum and supported by a fixed shaft which extends along the axis of rotation of said drum, said roller means being idle and able to rotate by friction within an annular guide, said annular guide being rigid with the inner wall of said drum, said roller means being provided with means for adjusting pressure of said roller means exerted against said annular guide, and means for selectively adjustably positioning the vertical axis of said roller means relative to the vertical axis of said drum normal to its axis of rotation whereby said roller means may be positioned to act in a zone in which material tends to be deposited.

2. A mill as claimed in claim 1, characterised in that said grinding roller means is composed of at least two rollers connected to a carriage supported by said fixed shaft.

3. A mill as claimed in claim 1, characterised in that said drum is rotated by driven support rollers mounted externally of said drum.

4. A mill as claimed in claim 1, characterised in that said adjustment means for regulating pressure are mechanical springs.

5. A mill as claimed in claim 1, characterised in that said roller means has an arcuate profile complementary to that of said annular guide.

6. A mill as claimed in claim 1, characterised in that to a side of each of said annular guides there is disposed a bladed ring rigid with the inner wall of said drum.

7. A mill as claimed in claim 1, characterised in that said drum is rotated by the action of a gear transmission.

8. A mill as claimed in claim 1, characterised in that said drum is frontally provided with a feed port for the material to be ground, and at its opposite end with at least one discharge port for the ground material.

9. A mill as claimed in claim 1, characterised in that said drum is frontally provided with an inlet to enable a gaseous stream to traverse the drum.

10. A mill as claimed in claim 9, characterised in that said drum is provided at its opposite end with a discharge port for said gaseous stream.

* * * * *